3,190,871
WATER-SOLUBLE REACTIVE DYES

Guenther Auerbach, Basel, Arthur Barthold, Reinach, Basel-Land, and Jakob Benz, Oberwil, Basel-Land, Switzerland, Kurt Brenneisen, Grenzach, Germany, and Roland Entschel, Philippe Grandjean, and Curt Mueller, Basel, August Schweizer, Muttenz, Basel-Land, and Walter Wehrli, Riehen, Switzerland, assignors to Sandoz Ltd., Basel, Switzerland
No Drawing. Filed Apr. 23, 1962, Ser. No. 189,268
16 Claims. (Cl. 260—146)

This invention relates to water-soluble reactive dyes of the formula

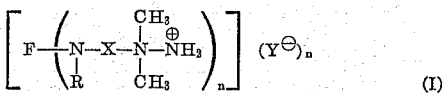

(I)

wherein

F represents the radical of a water-soluble dye, preferably a metal-free, metallizable or mteal-containing dye of the monoazo or disazo series, or of an anthraquinone or phthalocyanine dye, R represents hydrogen or substituted or unsubstituted alkyl.

X represents a substituted heterocyclic bridge member of the 1,3-diazine or 1,3,5-triazine series, $Y^\ominus$ represents an anion, and $n$ has the value 1 or 2.

X is preferably a divalent radical of the pyrimidine series bearing 1 to two halogen atoms of an atomic weight between 35 and 81, i.e. chlorine or bromine atoms, bound to carbon atoms, or a divalent radical of the symmetrical triazine series bearing an optionally substituted hydroxy or amino group.

The process for the production of the dyes comprises reacting 1 mol of a compound of the formula:

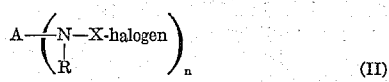

(II)

wherein A represents the radical of a water-soluble dye or of a compound convertible into a dye, with at least $n$ mols of asymmetrical dimethylhydrazine, and when A is the radical of a compound convertible into a dye, converting the reaction product into a dye by azo coupling or condensation.

The asymmetrical dimethylhydrazine used in the process (which is often termed N,N-dimethylhydrazine or 1,1-dimethylhydrazine in the literature), has the formula

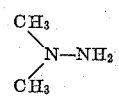

The substituent R is preferably a hydrogen atom or a low molecular alkyl with 1 to about 5 carbon atoms (methyl, ethyl), a low molecular hydroxyalkyl (2-hydroxyethyl, 2- or 3-hydroxypropyl), a low molecular alkoxyalkyl (2-methoxyethyl, 2-ethoxyethyl, 3-methoxypropyl, 3- or 4-methoxybutyl, a low molecular halogenalkyl (2-chloroethyl) or a phenylalkyl, e.g. benzyl.

The radical —X-halogen in Formula II is a halogenopyrimidyl radical or a 4-halogeno-1,3,5-triazinyl-2 radical substituted in the 6-position. Here the term halogeno-pyrimidyl radicals refers preferably to dichloro- or trichloro-pyrimidyl and dibromo- or tribromo-pyrimidyl radicals, e.g. the radicals remaining after the reaction of a chlorine or bromine atom with an exchangeable hydrogen atom, of the following polyhalogenopyrimidines: 2,4,6-trichloropyrimidine, 2,4,6-tribromopyrimidine, 2,4,5,6-tetrachloro- or -tetrabromopyrimidine. The 4-halogeno-1,3,5-triazinyl-2-radicals substituted in the 6-position are preferably radicals of the formula

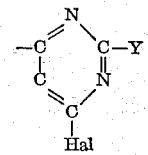

wherein Hal represents chlorine or bromine, and Y the radical, which may be further substituted, of a primary or secondary aliphatic, alicyclic, aromatic or heterocyclic amine, an aliphatic, alicyclic, aromatic or heterocyclic hydroxy or thiol compound, particularly the radical of aniline, its alkyl and sulfonic acid or carboxylic acid derivatives, of low mono- or di-alkylamines, or the radical of ammonia.

Water-soluble dyes or intermediate products with a halogeno-pyrimidyl radical which can be used as starting products of general Formula II for the reaction of the present process are those, for example, described in the French Patent 1,221,621 (dichloro- and dibromo-pyrimidylamino radicals) and the French additional patent 75,771 (trichloro- and tribromo-pyrimidyl-amino radicals).

Water-soluble dyes or intermediates with a substituted halogeno-triazinyl radical, which can be used as starting products of the general Formula II for the reaction of the process, are described, for example, in the Belgian Patents 559,944, 559,945, 560,734, 560,791, 560,792, 560,-793, 560,794, 560,795 and 563,864.

The anion $Y^\ominus$ may be, for example, a chlorine or bromine ion, or a sulfonate ion of the dye molecule itself or of a second dye molecule.

The reaction of the compounds of Formula II with asymmetrical dimethylhydrazine can be carried out in aqueous or aqueous-organic, neutral to alkaline solution or suspension. The reaction temperature may be low or moderately high, for example between 0° and 60° C. In many cases an addition of a salt of low to medium basicity, e.g. sodium or potassium bicarbonate, sodium or potassium carbonate, di-or tri-sodium phosphate, or di- or tri-potassium phosphate, is of advantage.

A preferred mode of operation of the process consists in the use of an excess of the asymmetrical dimethylhydrazine which presents a basic reaction. In certain cases it is advisable to conduct the reaction with exclusion of air-oxygen, for example in an atmosphere of nitrogen.

The time required for completion of the reaction depends on the composition of the compound of Formula II which is used, the amount of asymmetrical dimethylhydrazine, the reaction temperature, the pH value, and the extent of dilution; the time may vary within wide limits, for example from a few minutes to several hours. It can be shortened by increasing the temperature and/or the pH value.

After the reaction the reaction products are precipitated from the weakly alkaline, neutral or, preferably, weakly acid solution, for example by the addition of an organic water-miscible solvent and/or an alkali metal chloride or sulfate, and then filtered off. The isolated reaction products can be purified by redissolution and re-precipitation from solution.

When the reaction products of the compounds of Formula II and asymmetrical dimethylhydrazine are intermediates for dye synthesis, they are converted into dyes by the known methods. Reaction products containing diazotizable amino groups are diazotized and coupled with coupling components. Those which contain groupings capable of coupling are reacted with diazo compounds to give azo dyes. These coupling reactions are best carried out in a weakly acid, neutral or weakly alkaline aqueous medium.

The reaction products of compounds of Formula II and asymmetrical dimethylhydrazine, which contain free amino groups, can be reacted with the chlorides of acids to give the final dyes, e.g. the chlorides of phthalocyanine-polysulfonic acids.

The dyes obtained by the process of the invention are dried at 40–100° C. with vacuum. They are remarkably stable in neutral and acid media.

In the present process dyes or dye intermediate products having mobile halogen atoms are treated with asymmetrical dimethylhydrazine under fairly mild conditions. It is characteristic of the process that the compounds obtained as reaction products are of much higher reactivity than the corresponding starting materials. This is evident from the fact that the corresponding known reactive dyes with mobile halogen atoms, upon reaction with asymmetrical dimethylhydrazine, can be fixed on textile fibers, notably cellulose, under milder conditions than are normally necessary.

More particularly, the difference in the reactivity of the starting materials and the final products shows with certainty that the final products have the constitution of acyl-dimethylhydrazonium compounds:

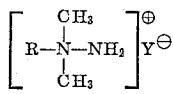

The central nitrogen atom in these compounds is bound to three carbon atoms and a nitrogen atom through covalent linkages. By reason of their structure with ion pairs they exhibit salt-like character. The anion $Y^\ominus$ can be combined with the cation, for example in the form of an $SO_3^\ominus$ group, to form an inner-molecular compound, the molecule then having the form of a betaine. Like the acyl-ammonium compounds, these acyldimethylhydrazonium compounds are excellent alkylating agents.

It is conceivable that the starting products would react with cleavage of a proton of the asymmetrical dimethylhydrazine to yield acylated dimethyl-hydrazines:

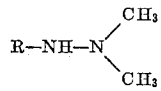

In contrast to the acyldimethylhydrazonium compounds, these compounds do not contain a nitrogen atom linked with four bonds.

The reaction of acyl halides with hydrazine and substituted hydrazines, e.g. methylhydrazine and phenyl-hydrazine, to the corresponding acylated derivatives is known. These acyl hydrazines are characterized by having substantially lower reactivity than the halogen compounds used for their synthesis. In contrast to the quaternary acyldimethylhydrazonium compounds they are not generally suitable for use as acylating agents owing to their low reactivity. For the production of acylated hydrazines it is advisable to employ more rigorous conditions than for the quaternation of the same halogen compounds with asymmetrical dimethylhydrazine.

The products obtained by the present process do not therefore possess the constitution of acylated dimethyl-hydrazines. This is surprising, especially in view of the steric structure of the asymmetrical dimethylhydrazine.

The quaternation of the starting dyes used in the present process is already known. In Textil-Praxis 15 (1960), p. 831, Wegmann describes a pyridinium salt, which "does not bring about a more rapid reaction." It is therefore surprising that the dimethylhydrazonium dyes of this invention possess considerably higher reactivity than the starting compounds.

The dyes obtained are suitable for the dyeing of leather and the dyeing, pad dyeing and printing of fibers of animal origin, e.g. wool and silk; synthetic polyamide fibers, e.g. nylon; cellulosic fibers, e.g. cotton, linen; fibers of regenerated cellulose, e.g. viscose rayon filament and staple fiber and cuprammonium rayon; and mixtures or other articles of these fibers. The dyes reserve cellulose 2½- and triacetate or acetobutyrate, linear aromatic polyester fibers (e.g. polyethyleneterephthalate fibers), polyacrylonitrile fibers, polyvinyl chloride and acetate and polyalkylene fibers (e.g. polyethylene and polypropylene fibers). The optimum conditions of application vary according to the nature of the fiber and the dyes used.

The dyeing, padding and printing or fixation of the dyes on cellulosic fibers is carried out to best advantage in a neutral to alkaline medium, e.g. in presence of sodium bicarbonate, sodium carbonate, sodium hydroxide solution, potassium hydroxide solution, sodium metasilicate, sodium borate, trisodium phosphate, ammonia, etc. and the application medium may contain the usual dispersing, emulsifying or thickening agents and other textile or leather auxiliary agents as required.

In comparison with the halogenopyrimidyl and halogenotriazinyl dyes used as starting materials, the dyes of the invention have the great advantage that they react with textile fibers much more easily and rapidly. Thus they can be fixed on cotton, for example, at room temperature instead of at 90°–100° C., and in the pad-batch process the time of storage can be shortened and/or the alkaline addition or the alkalinity of the padding liquor reduced.

The dyeings and prints on cellulosic fibers are notable for their outstanding wet fastness properties (fastness to water, sea-water, washing, perspiration, soda boiling, rubbing), which are due to the formation of a stable chemical linkage between the dye molecule and the cellulose molecule. In addition the dyeings and prints possess good fastness to light and to dry cleaning (organic solvents). Often the total amount of dye applied does not take part in the reaction with the fiber. This portion of unreacted dye is subsequently removed from the fiber by suitable treatment, such as washing and/or soaping, if necessary at higher temperatures. For this purpose synthetic detergents can be used, e.g. alkylarylsulfonates, sodium lauryl sulfate, sodium lauryl polyglycol ether sulfate, alkylpolyglycol ethers and mono- or di-alkylphenyl-polyglycol ethers which may be carboxymethyated or not.

In the following examples the parts and percentages are by weight and the temperatures in degrees centigrade.

*Example 1*

75 parts of the dye sodium 1-hydroxy-2-[3'-(2",5"-trichorolpyrimidyl - 4" - amino) - phenylazo]-naphthalene-4,6,6'-trisulfonate are dissolved in 600 parts of water at 40°. 7 parts of asymmetrical dimethylhydrazine are added and the reaction mixture stirred for 4½ hours at 40°. The precipitated reaction product is filtered off, washed with dilute sodium chloride solution, and the press cake dried at 80–100° with vacuum and ground. The dye is obtained as a dark red powder which dissolves in water with a scarlet coloration.

Dyeing can be carried out as follows:

2.4 parts of the dye obtained by the above procedure and 8 parts of urea are dissolved in 100 parts of water at room temperature. A second solution of 6 parts of calcined sodium carbonate in 100 parts of water is prepared. During the padding process both solutions are mixed in a mixing device in the ratio of 3:1 and continuously added to the trough of the pad as required. A mercerized cotton fabric is impregnated with this solution at room temperature, squeezed to contain 70% of its dry weight and rolled up. To prevent drying, the roll is wrapped in an airtight plastic foil. It is left for 6 hours at room temperature. The cotton fabric is then rinsed in hot and cold water, treated for 10 minutes at 100° with a 0.3% solution of a non-ionic detergent, rinsed and dried. A brilliant scarlet dyeing of excellent wet fastness and very good light fastness is obtained.

*Example 2*

37 parts of 1-amino-3-[2',5',6'-trichloropyrimidyl-(4')-amino]-benzene-6-sulfonic acid together with sodium hydroxide solution are dissolved in 550 parts of water at 50°, and the neutral solution cooled to 20°. 6.8 parts of asymmetrical dimethylhydrazine are added with stirring, upon which the solution becomes markedly alkaline. The solution is stirred at 20–25°, while its pH value slowly decreases, and is maintained at 8.3 to 8.5 by the addition of 10% sodium carbonate solution. The reaction product begins to precipitate in a colourless, crystalline form. Sodium carbonate solution is added until the pH value no longer changes considerably, which requires approximately 4 hours. The consumption of 10% sodium carbonate solution is about 38 parts. The suspension is stirred overnight at room temperature, then the precipitated reaction product is filtered off, and the filter residue largely freed from remaining filtrate by washing with dilute common salt solution.

The moist filter cake is stirred into 1200 parts of water at 30°, 30 parts of 30% hydrochloric acid added and the solution cooled to 10° by the addition of ice. A dilute solution of 4 parts of sodium nitrite is then run in. The resulting solution of the diazo compound is greenish yellow in colour. On completion of diazotization the excess nitrous acid is destroyed by adding a little aminosulfonic acid.

18.8 parts of 1-phenyl-3-methyl-5-pyrazolone-2',5'-disulfonic acid are added to this solution of the diazo compound, and the coupling solution rendered neutral by the addition of sodium carbonate in portions. On completion of coupling the golden yellow dye solution is weakly acidified with dilute acetic acid, heated to 40° and the dye precipitated with sodium chloride. It is filtered off and the filter residue washed with dilute sodium chloride solution. The moist filter cake is dried with vacuum at 80° and then ground. The resulting dye is obtained as a yellow powder which dissolves both in water and concentrated sulfuric acid with a yellow coloration.

When in the above example the 18.8 parts of 1-phenyl-3-methyl-5-pyrazolone-2,5'-disulfonic acid are replaced by 18.2 parts of 1-(2',5'-dichlorophenyl)-3-methyl-5-pyrazolone-4'-sulfonic acid, a dye of the same colour and similar properties but of somewhat lower solubility is obtained.

30 parts of the dye obtained by the above procedure are dissolved in 300 parts of cold water and 100 parts of urea added to this solution, which is then stirred into 450 parts of 4% sodium alginate thickening. To this paste are added 10 parts of sodium bicarbonate and 10 parts of sodium 3-nitrobenzenesulfonate. The mass is stirred vigorously and cold water added so that the whole totals 1000 parts.

A cotton fabric is printed with this printing paste, dried at room temperature and then steamed for 30 seconds at 102° in a rapid ager. The goods are then rinsed in cold water, soaped at the boil, rinsed again in cold water and dried.

A brilliant greenish yellow print is obtained which has excellent light and wet fastness properties.

*Example 3*

85 parts of the dye sodium 1-hydroxy-2-(4'-methoxyphenylazo)-6-[N-methyl-N-6''-methoxy-4''-chloro-1'',3'',5''-triazinyl-2''-amino]-naphthalene-3,2-disulfonate, produced in the normal way, are dissolved in 1700 parts of water at 20° and pH 7.5. 12 parts of asymmetrical dimethylhydrazine are added to this solution with stirring, upon which the pH value increases by about two units, but on continued stirring decreases a little. After 15 minutes' vigorous stirring, the mass, which in the meantime has become jelly-like, is acidified with dilute hydrochloric acid. The dye is then precipitated by the addition of sodium chloride and filtered off. The residue is washed with dilute sodium chloride solution, compressed well and dried at 60–80° with vacuum. A red powder is obtained which dissolves in water with a scarlet coloration.

20 parts of the dye obtained by the above procedure are dissolved in 1000 parts of water. A mercerized cotton fabric is padded with this solution and squeezed to contain 90% of its dry weight. The moist cotton is treated for 30 minutes at 25° in a bath consisting of 1000 parts of water, 150 parts of calcined sodium sulfate and 2 parts of calcined sodium carbonate. The dyeing is subsequently finished in the normal way. A brilliant scarlet dyeing with excellent wet fastness and good light fastness is obtained.

*Example 4*

134 parts of the 1:2 cobalt complex compound of the monoazo dye sodium 1-phenyl-3-methyl-4-[2''-hydroxy-3''-(4'''-chloro-6'''-amino-1''',3''',5'''-triazinyl-2'''-amino)-phenylazo]-5-pyrazolone-4',5'-disulfonate produced in the normal way are dissolved in 600 parts of water at 20°. 16 parts of asymmetrical dimethylhydrazine are added with stirring to this solution, upon which the pH values increases but on continued stirring decreases a little. After stirring for about 2½ hours, during which time a part of the dye precipitates, the volume is made up to 1000 parts with water, the suspension neutralised with dilute acetic acid, and the dye precipitated by the addition of 100 parts of common salt and filtered off. The filter residue is washed with dilute common salt solution, compressed well and dried at 60–80° with vacuum. A dark violet-brown powder is obtained which dissolves in water with a yellow-brown coloration.

20 parts of the dye obtained by the procedure described above are dissolved in 760 parts of cold water together with 200 parts of urea and 20 parts of sodium carbonate. A mercerised cotton fabric is padded with this solution and squeezed to contain 90% of its dry weight. The cotton is dried at 120° for 2 minutes. The dyeing is then finished by soaping and rinsing in the normal way. The brown dyeing possesses excellent light fastness and very good wet fastness.

*Example 5*

138 parts of the 1:2 chrome complex compound of sodium 1-hydroxy-2-(2'-hydroxy-5'-nitrophenylazo)-8-(2'',5'',6''-trichloropyrimidyl-4''-amino)naphthalene-3,6-disulfonate, produced according to the particulars of the Belgian Patent No. 589,104, are dissolved in 800 parts of water at 20°. 13.5 parts of asymmetrical dimethylhydrazine are added to this solution. The reaction mass, of strongly alkaline reaction, is stirred for 5 hours at 20° during which time the pH value gradually decreases. The reaction product gradually precipitates. It is filtered off, washed with dilute sodium chloride solution, dried and ground. A dark powder is obtained which dissolves in water with a bluish gray coloration.

A cotton fabric is impregnated with a solution of 20 parts of the dye obtained by the above procedure and 30 parts of calcined sodium carbonate in 1000 parts of water, squeezed to contain 90% of its dry weight, and then rolled up. The roll is wrapped in plastic sheet and stored for 2 hours at room temperature. Subsequently the dyeing is finished in the normal way by rinsing and soaping. A greenish gray dyeing is obtained which has excellent fastness to light and wet treatments.

Example 6

71.6 parts of the monoazo dye sodium 1-hydroxy-2-phenylazo - 8 - (4″,6″-dichloropyrimidyl - 2″-amino)- or -8-(2″,6″-dichloropyrimidyl-4″-amino)-naphthalene - 3,6, 2′-trisulfonate, prepared by the usual method of coupling 1-diazobenzene-2-sulfonic acid with the primary condensation product of 1-amino-8-hydroxynaphthalene-3,6-disulfonic acid and 2,4,6-trichloropyrimidine, are dissolved in 600 parts of water. The resulting clear solution is cooled to 10–15°, and 7.2 parts of asymmetrical dimethylhydrazine are added, upon which the pH value first increases and then decreases. The pH value is maintained at 7.5 to 8.5 with dilute sodium carbonate solution, and stirring continued at 10–15° until the pH remains constant without further addition of sodium carbonate solution. A little diluted acetic acid is dropped in to bring the pH to 6.5–7.0, and common salt added to the solution until the dye precipitates. It is then filtered off, purified by dissolving in water and then salting out, and dried at 70–80° with vacuum. The resulting reaction product is obtained as a red dye which dissolves in cold water with a red, and in concentrated sulfuric acid with a violet, coloration.

The same dye can also be synthesized in the following way:

46.6 parts of the primary condensation product of 1-amino-8-hydroxynaphthalene-3,6-disulfonic acid and 2,4,6-trichloropyrimidine are dissolved in 750 parts of water with the addition of dilute sodium hydroxide solution. 24 parts of dimethylhydrazine are added to this solution at 25–30°, which is then stirred for 4 hours. Sufficient dilute hydrochloric acid is added to reduce the pH value to 5–6, and subsequently 25 parts of sodium chloride for every 100 parts of solution. After a time the reaction product precipitates. It is isolated by filtration and washed with dilute sodium chloride solution.

Meanwhile 9.5 parts of 1-aminobenzene-2-sulfonic acid are dissolved in 100 parts of water with the addition of dilute sodium hydroxide solution. 15 parts of concentrated hydrochloric acid are added to the solution which is then cooled to 0° and diazotized with 3.8 parts of sodium nitrite. The diazo suspension formed is added to the solution of the coupling component, obtained according to the above particulars, in 600 parts of water at 0–5°. The coupling mass is maintained only weakly acid by the dropwise addition of sodium carbonate solution. On completion of coupling the solution is heated to 50° and the dye precipitated with sodium chloride, filtered off and dried at 70–80° with vacuum.

100 parts of mercerised cotton fabric are dyed in a winch in a dyebath of 3000 parts as follows:

1.5 parts of the dye produced by the procedure given above are dissolved in 100 parts of soft water at 25° and added to the dyebath containing 180 parts of calcined Glauber's salt. The goods are entered at 20–25° and run for 30 minutes at room temperature. 15 parts of calcined sodium carbonate are added and the goods dyed for a further hour at room temperature. The liquor is then run off and the goods rinsed in cold and warm water, soaped at the boil for 20 minutes with a 0.1% solution of a non-ionic detergent, and rinsed. A brilliant bluish red dyeing is obtained which has very good wet fastness and good light fasteness properties.

Example 7

250 parts of 1 - [2′,5′,6′ - trichloropyrimidyl - (4′)-amino] - 8 - hydroxynaphthalene-3,6-disulfonic acid are stirred into 2000 parts of water at 30° and dissolved with dilute sodium hydroxide solution at a pH value of 7.5. 120 parts of asymmetrical dimethylhydrazine are added with thorough stirring. The reaction solution slowly turns greenish yellow. It is stirred for 1½ hours at 30–35°. The reaction product is precipitated with sodium chloride, filtered off and washed thoroughly with sodium chloride solution.

The yellow filter residue is redissolved in 2000 parts of water at room temperature, salted out with sodium chloride and filtered off. It is then dissolved in 1500 parts of water at room temperature and the pH value brought to 6.5–7.0 with a little dilute acetic acid. 60 parts of crystallized sodium acetate are then added and the yellow suspension formed cooled to 5°.

In the meantime 70 parts of 1-aminobenzene-2-sulfonic acid are stirred into 700 parts of water, acidified with 60 parts of 30% hydrochloric acid and the resulting suspension cooled to 0°. 150 parts of a 20% sodium nitrite solution are run in, the temperature being maintained at 0–3°. On completion of diazotization the excess nitrous acid is destroyed by the addition of a little aminosulfonic acid.

The suspension of the diazo compound is run into the suspension of the coupling component at 5° during the course of 30 minutes and with good stirring. A readily soluble red dye is formed. When the addition of the diazo compound is complete, the pH of the coupling mass, which reacts weakly acid, is adjusted to 6.5–7.0 by adding sodium carbonate at 5–10°, thus completing the coupling reaction. The solution is once again rendered weakly acid with acetic acid, the dye salted out with sodium chloride, filtered, washed with sodium chloride solution, dried at 60° with vacuum, and ground. A red brown powder is obtained which dissolves in water with a red coloration.

100 parts of mercerised cotton fabric are dyed on the jig in a dyebath of 500 parts as follows:

1.5 parts of the dye obtained by the above procedure are dissolved in 100 parts of water 25° and added to the dyebath in portions over two ends. The temperature of the bath is 20–25°. After a further two ends, 20 parts of calcined Glauber's salt are added in portions over the next two ends. After another 4 ends, 10 parts of calcined sodium carbonate are added over two ends. After a further 6 ends, the liquor is run off at room temperature and the dyeing rinsed in cold and hot water, soaped at the boil and rinsed. A brilliant bluish red dyeing is obtained which has very good wet fastness and good light fastness.

Example 8

110 parts of the 1:1 copper complex compound of sodium 1-hydroxy-2-(1′-hydroxy-naphthyl-2′-azo)-8-(4″-chloro - 6″ - phenylamino-1″,3″,5″-triazinyl-2″-amino)-naphthalene - 3,6,4′,8′,3‴ - pentasulfonate, which can be produced by coupling diazotised 2-naphthylamine-4,8-disulfonic acid with the secondary condensation product of molar amounts of cyanuric chloride, 1-amino-8-hydroxynaphthalene - 3,6 - disulfonic acid and 1-aminobenzene-3-sulfonic acid and subsequent oxidative coppering, are disolved in 1400 parts of water. The solution is adjusted to pH 7.5 and then cooled to 0°. A solution of 18 parts of asymmetrical dimethylhydrazine in 240 parts of water is added with stirring, the pH being adjusted to 7.5 by the addition of dilute hydrochloric acid. The reaction mixture is stirred for about 90 minutes at a temperature of 0–5°, and the solution weakly acidified with dilute hydrochloric acid. The dye is precipitated with iso-propanol and filtered off. The residue is washed with iso-propanol, compressed and dried at room temperature. A dark powder is obtained which dissolves in water with a blue coloration.

When the dye obtained is dyed and fixed on cotton in cold alkaline medium, by the procedure of Example 3 a reddish blue dyeing is obtained which has excellent wet fastness and very good light fastness.

Example 9

24 parts of the dye of the formula

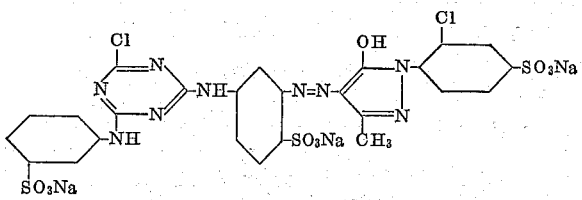

are stirred into 180 parts of water at 20°, upon which partial solution occurs. After stirring for some time, 2.4 parts of asymmetrical dimethylhydrazine are added, upon which the pH value markedly increases. The turbid solution is stirred for about 30 minutes, rendered neutral with dilute hydrochloric acid and the dye precipitated with acetone. The precipitate is filtered off, washed with acetone and dried at 60–80° with vacuum. A yellow powder is obtained which dissolves in water with a greenish yellow coloration.

When the dye obtained according to the above particulars is fixed on a cellulosic fabric in cold alkaline medium following the procedure given in Example 3, a greenish yellow dyeing is obtained which possesses excellent light fastness and very good wet fastness.

Example 10

87 parts of sodium 1-hydroxy-2-phenylazo-8-(4''-chloro-6'' - phenylamino - 1''',3''',5'''-triazinyl-2'''-amino)-naphthalene-3,5,2',4'''-tetrasulfonate, prepared in the normal way, are dissolved in 500 parts of water at 40°. 7 parts of asymmetrical dimethylhydrazine are added and the reaction mixture stirred for 4 hours at 40°. The solution is subsequently weakly acidified with dilute acetic acid, the dye precipitated with sodium chloride and filtered off. The residue is washed with dilute sodium chloride solution, compressed and dried at 50–60° with vacuum. A red powder is obtained which dissolves in water with a red coloration.

When this dye is printed from an alkaline paste on a cotton fabric according to the method of Example 2, a brilliant red print is obtained which has excellent wet fastness and good light fastness.

Example 11

20 parts of the dried reaction product of 1-amino-3-[2',5',6'-trichloropyrimidyl-(4')-amino]-benzene - 6 - sulfonic acid and N,N-dimethylhydrazine, produced according to the method of Example 2, are stirred into 1000 parts of water at room temperature, acidified with 30 parts of 30% hydrochloric acid and diazotized with a concentrated aqueous solution of 3.5 parts of sodium nitrite at 10–15°. The yellow solution of the diazo compound is freed from excess nitrous acid, then 30 parts of the dried reaction product of 1 - [2',5',6' - trichloropyrimidyl-(4')-amino]-8-hydroxynapthalene-3,6-disulfonic acid and N,N-dimethylhydrazine, obtained according to the method of Example 7, are added in small portions. The pH value of the coupling mass is adjusted to 4–4.5 by the addition of crystallized sodium acetate with stirring. On completion of coupling, the dye suspension is heated to 50°, sodium chloride solution added, the dye filtered off and rinsed with dilute sodium chloride solution. The filter cake is dried at 60° with vacuum and ground to give a brown powder which dissolves in hot water with a red coloration.

When this dye is fixed on cotton fabric in alkaline medium, a bluish red dyeing of very good wet fastness is obtained.

Example 12

99 parts of the monosodium salt of the secondary condensation product of 1-amino-3-(4',6'-dichloro-1',3',5'-triazinyl-2'-amino)benzene-6-sulfonic acid and 1-aminobenzene-3-sulfonic acid, produced by the normal method, are stirred into 450 parts of water at 20°, and dissolved by the addition of dilute sodium carbonate solution. 14 parts of asymmetrical dimethylhydrazine are added to the clear solution and after about 30 minutes' stirring 500 parts of methanol are added. The solution is then rendered strongly acid with dilute hydrochloric acid. The precipitated reaction product is filtered off and washed with methanol.

The well compressed residue is stirred into 1000 parts of water and the suspension neutralized to a weakly acid reaction with sodium acetate. 14 parts of sodium nitrite are added. The suspension is then run with good stirring in 15 minutes into a mixture of 50 parts of concentrated hydrochloric acid and 100 parts of ice, the temperature of the reaction mixture being maintained at 0–5°. The pale yellow diazo suspension is stirred for some time. The excess nitrite is destroyed with aminosulfonic acid, and then 62 parts of the sodium salt of 1-(2'-chlorophenyl)-3-methyl-5-pyrazolone-4'-sulfonic acid are added. The pH value of the mixture is brought to 3–4 by the addition of crystallized sodium acetate. On completion of coupling the yellow dye is precipitated with ethanol, filtered off, washed with ethanol and dried at 60–80° with vacuum. In this way a dye is obtained which is identical with that of Example 9.

Example 13

134 parts of the trisodium salt of the secondary condensation product of 1-(4',6'-dichloro-1',3',5'-triazinyl-2'-amino)-8-hydroxynaphthalene-3,6-disulfonic acid and 1-aminobenzene-4-sulfonic acid are stirred into 1900 parts of water at 20°. 18 parts of asymmetrical dimethylhydrazine are added to the suspension with stirring, upon which the pH value increases and during 2 hours' stirring decreases a little. With continued stirring the pH is maintained at 7.5 by the dropwise addition of sodium carbonate solution, and the almost completely dissolved reaction product subsequently precipitated with acetone. It is filtered off, the light gray residue washed with acetone and compressed well.

In the meantime 35 parts of 1-aminobenzene-2-sulfonic acid are diazotized in the normal way. The presscake obtained as described above is stirred into the suspension of the diazo compound at 0–5° and coupling completed at 5–15° and a pH value of 4–5. The resulting red dye is precipitated with sodium chloride or acetone and filtered off. The residue is washed with dilute sodium chloride solution or acetone, compressed well and dried at 60–80° with vacuum. A brown powder is obtained which dissolves in water with a blue-red coloration.

The identical dye is obtained by first reacting diazotized 1-aminobenzene-2-sulfonic acid with the above coupling component and treating the resulting monochlorotriazinyl dye with asymmetrical dimethylhydrazine.

When this dye is fixed on a cellulose fabric from alkaline medium, a bluish red dyeing with excellent wet fastness properties is obtained.

Example 14

82 parts of the dye sodium 1-amino-4-[4'-(4''-chloro-6''-phenylamino - 1''',3''',5''' - triazinyl-2'''-amino)-phenylamino]-anthraquinone-2,3',4'''-trisulfonate, produced by the normal method, are dissolved in 1200 parts of water at 20–25° and the pH adjusted to 7. 24 parts of N,N-dimethylhydrazine are added and the reaction mixture stirred for about 20 minutes at room temperature. The solution is subsequently weakly acidified with dilute hydrochloric acid, the dye precipitated with acetone and isopropanol, and then filtered off. The residue is washed with acetone, compressed and dried at 50–60° with vacuum.

A dark powder is obtained which dissolves in water to give blue solutions.

When the dye obtained in accordance with the above particulars is fixed on a cellulose fabric by the method given in Example 3, a greenish blue dyeing is obtained which possesses excellent wet fastness and very good light fastness.

Example 15

16.4 parts of the dye sodium 1-amino-4-[3'-(4''-chloro-6''-phenylamino-1'',3'',5''-triazinyl - 2'' - amino) - phenylamino]-anthraquinone-2,4',4'''-trisulfonate, produced in the normal way, are dissolved in 100 parts of water at 20°. 3 parts of asymmetrical dimethylhydrazine are stirred into the solution. The pH value increases immediately but on continued stirring decreases a little. After stirring for approximately 2 hours at room temperature, the solution is rendered neutral, the reacted dye precipitated with acetone and filtered off. The residue is washed with acetone, compressed and dried at 60–80° with vacuum. A dark blue powder is obtained which dissolves in water with a blue coloration.

When the dye is treated with asymmetrical dimethylhydrazine at 60°, the reaction is completed in a few minutes.

When the dye obtained by the procedure given above is fixed on a cellulosic fabric according to the particulars of Example 3, a reddish blue dyeing is obtained which has excellent wet fastness and very good light fastness properties.

Example 16

68.4 parts of the dye which is produced by the usual method and has the formula

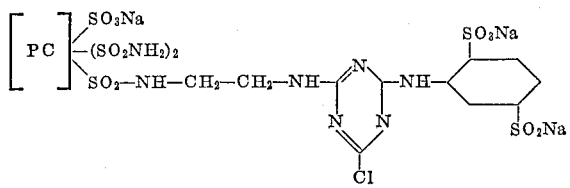

are dissolved in 300 parts of water at 20°. 4.5 parts of asymmetrical dimethylhydrazine are stirred in, upon which the pH value increases by 1–2 units but decreases somewhat on continued stirring. After stirring for about four hours, the solution is rendered neutral, the dye precipitated with sodium chloride and filtered off. The residue is washed with dilute sodium chloride solution, compressed and dried at 60–80° with vacuum. A dark blue powder is obtained which dissolves in water with a bright blue coloration.

When this dye is fixed on cellulosic fabric following the procedure given in Example 3, a brilliant turquoise dyeing with excellent wet fastness properties is obtained.

Example 17

21.7 parts of 1-amino-2-carboxybenzene-4-sulfonic acid are stirred into 200 parts of water and dissolved by the addition of dilute sodium hydroxide solution until the solution reacts neutral. An aqueous solution of 7 parts of sodium nitrite is added, the mixture cooled and then run into a cooled solution of 30 parts of 30% hydrochloric acid in 100 parts of ice-water. On completion of diazotization the excess nitrous acid is destroyed by the addition of a little aminosulfonic acid.

57 parts of the dried reaction product of 1-[2',5',6'-trichloropyrimidyl-4'-amino] - 8-hydroxynaphthalene-3,6-disulfonic acid and asymmetrical dimethylhydrazine, obtained by the method given in Example 7, are dissolved in 600 parts of water and cooled to 5°. 15 parts of crystallized sodium acetate are added and the diazo solution run in at 5–10°. A red monoazo dye of good solubility is formed. It is precipitated by adding sodium chloride and acetone, filtered off and washed with an aqueous sodium chloride solution containing acetone, dried at 60° with vacuum and ground. A red-brown powder is obtained which dissolves in water with a bluish red coloration.

15 parts of this dye are dissolved in 1000 parts of water and a mercerized cotton fabric padded with this solution. The fabric is then squeezed to obtain 90% of its dry weight and dried at room temperature. It is then treated for 10 minutes at 25° in 1000 parts of an aqueous solution containing 5 parts of sodium carbonate and 300 parts of sodium sulfate. The dyeing is rinsed in cold and hot water, soaped at the boil for 15 minutes and rinsed again in hot and cold water.

The red dyeing obtained is then treated for 20 minutes at 60° in 1000 parts of an aqueous solution containing 20 parts of crystallized copper sulfate and 20 parts of 30% acetic acid. After rinsing and drying, a brilliant violet dyeing is obtained which has excellent wet fastness and good light fastness properties.

The following table contains further dyes which are obtainable according to the particulars of Examples 1 to 17. In the table the sign $A^\oplus$ stands for

the sign $Y^\ominus$ for an anion, e.g. a chlorine or bromine ion, the half of a sulfate ion, or a sulfonate ion of the dye molecule itself or of a second dye molecule, and PC for the copper phthalocyanine radical.

The dyeings produced on cotton with the dyes of the table are of the following shade.

| No.: | Shade |
|---|---|
| 1 | Blue. |
| 2 | Yellow. |
| 3 | Yellow. |
| 4 | Orange. |
| 5 | Blue-gray. |
| 6 | Dark green. |
| 7 | Violet. |
| 8 | Violet. |
| 9 | Reddish blue. |
| 10 | Turquoise blue. |
| 11 | Navy blue. |
| 12 | Violet-brown. |
| 13 | Yellow. |
| 14 | Red. |
| 15 | Dark green. |
| 16 | Red. |
| 17 | Reddish yellow. |
| 18 | Orange. |
| 19 | Red. |
| 20 | Yellow. |
| 21 | Ruby. |
| 22 | Red. |
| 23 | Yellow. |
| 24 | Reddish yellow. |
| 25 | Blue. |
| 26 | Bluish red. |
| 27 | Violet. |
| 28 | Ruby. |
| 29 | Ruby. |
| 30 | Bluish red. |
| 31 | Bluish red. |
| 32 | Bluish red. |
| 33 | Scarlet. |
| 34 | Red. |
| 35 | Orange. |
| 35 after coppered | Ruby. |
| 36 | Bluish red. |
| 37 | Orange. |
| 38 | Scarlet. |
| 39 | Blue. |
| 40 | Bluish red. |
| 41 | Blue-red. |
| 42 | Scarlet. |
| 43 | Yellow. |
| 44 | Red. |

(1) 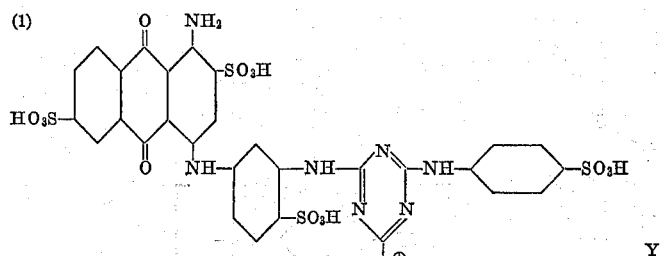
(2) 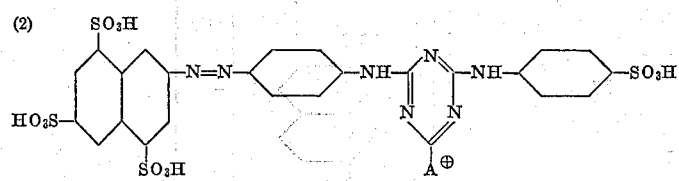
(3) 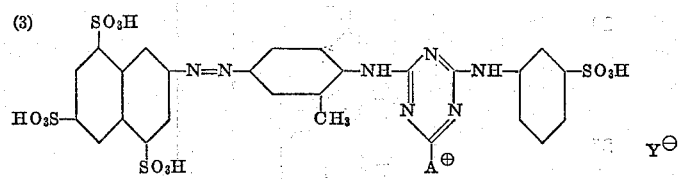
(4) 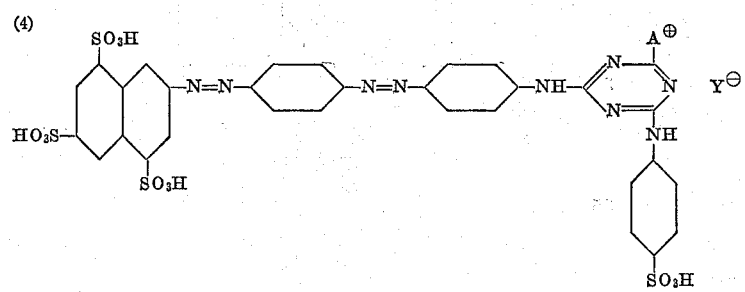
(5) 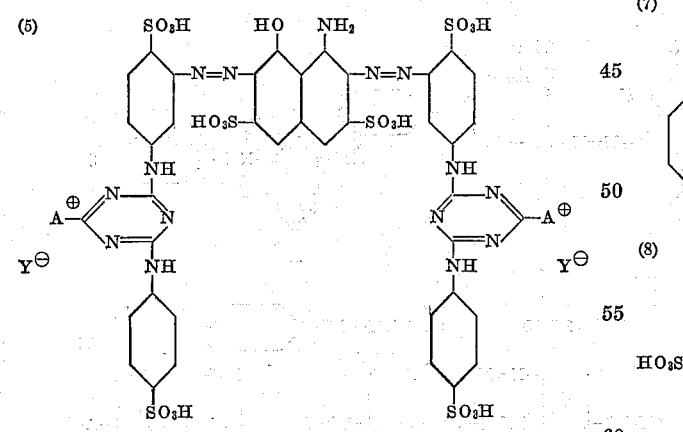
(6) 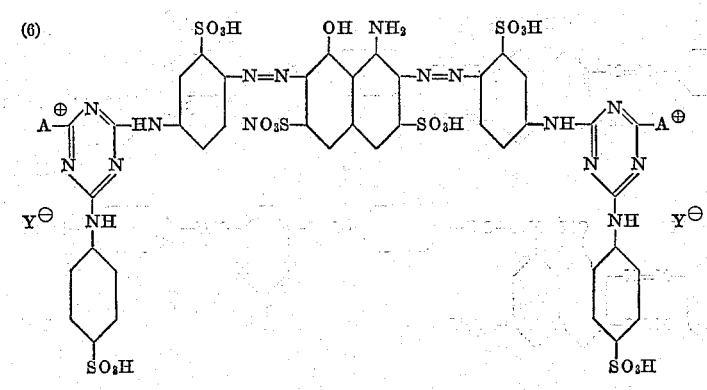
(7) 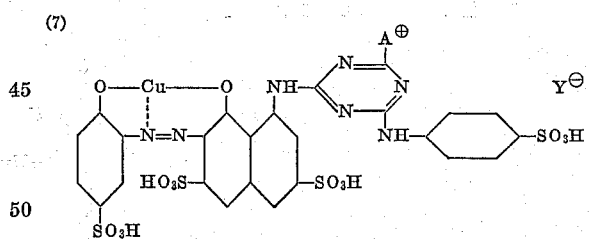
(8) 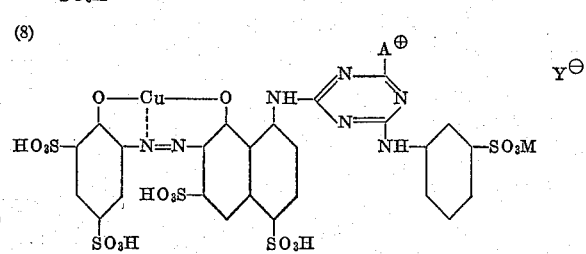

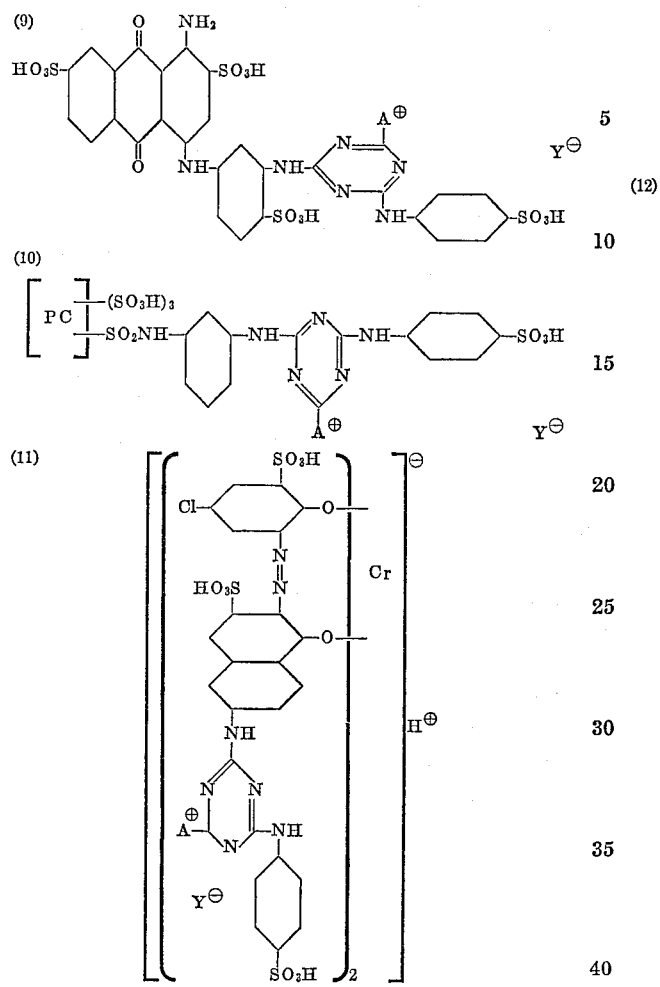
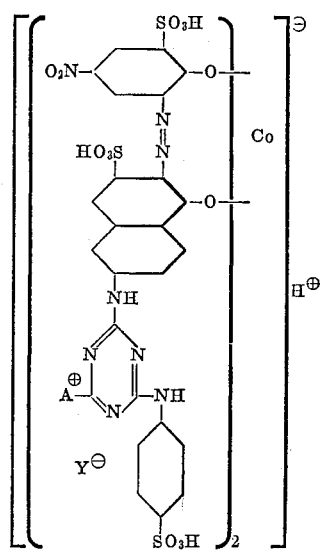
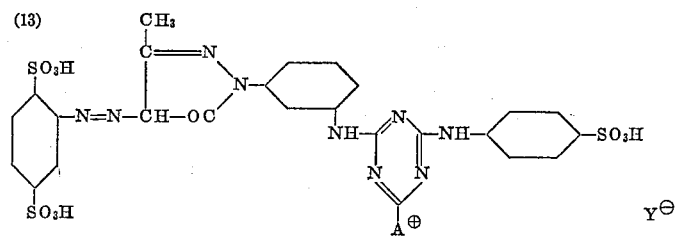
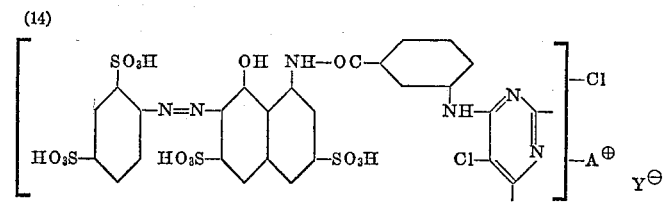
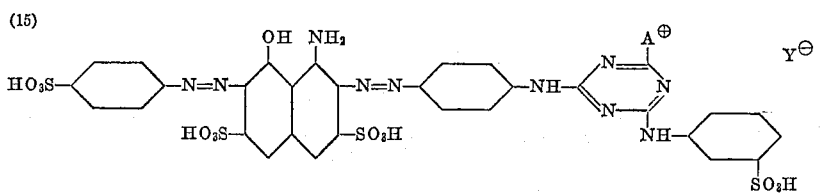
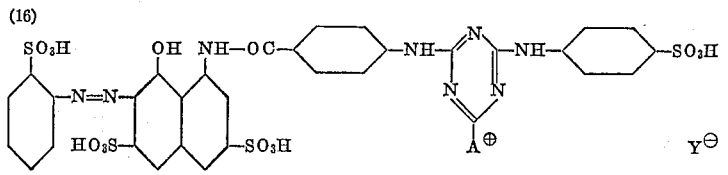

3,190,871

17 18

(17), (18), (19), (20), (21), (22), (23), (24), (25)

(26)
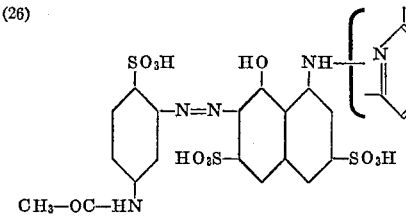
(30)
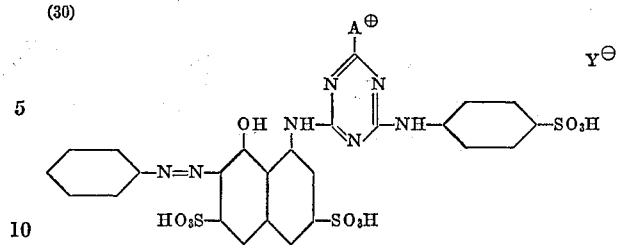
(27)
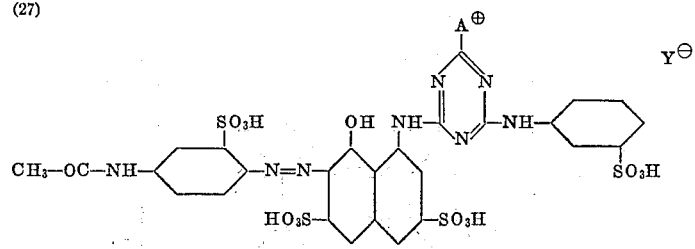
(28)
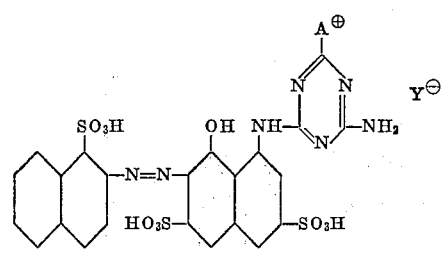
(31)
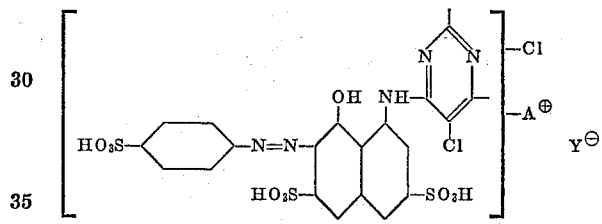
(29)
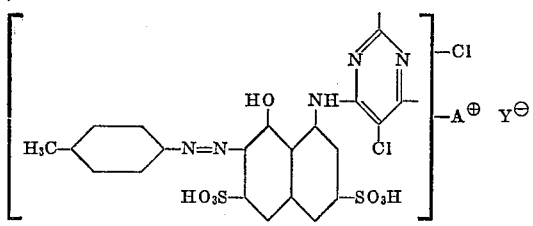
(32)
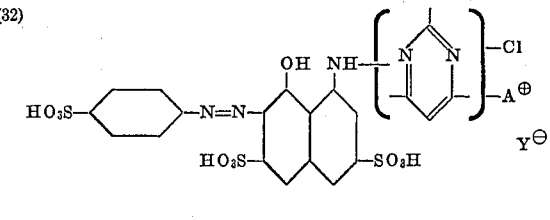
(33)
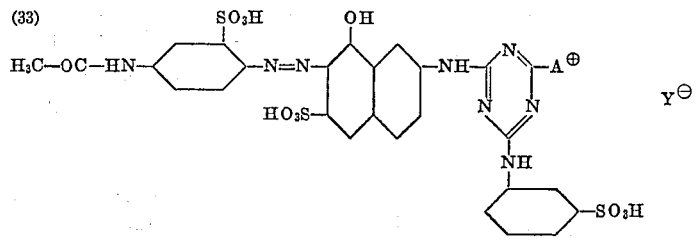
(34)
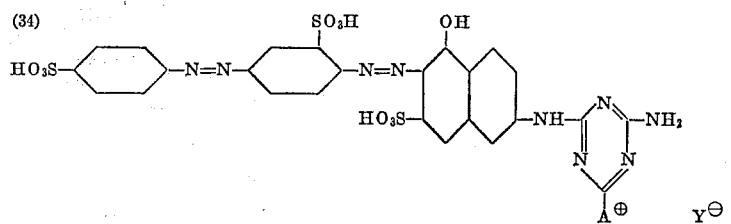
(35)
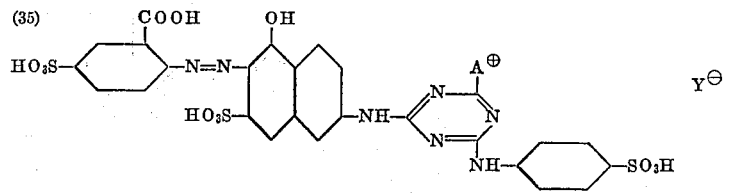

(36) 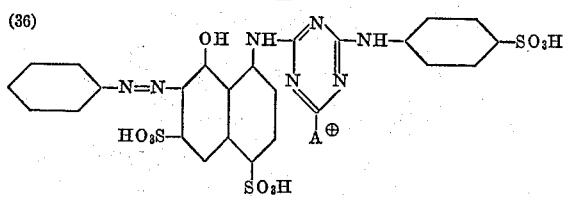

(37) 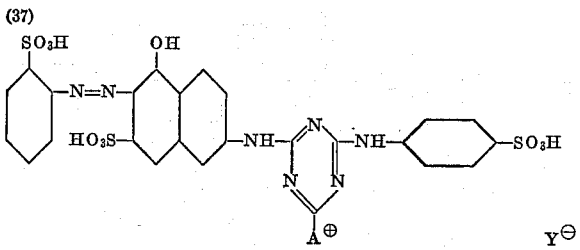

(38) 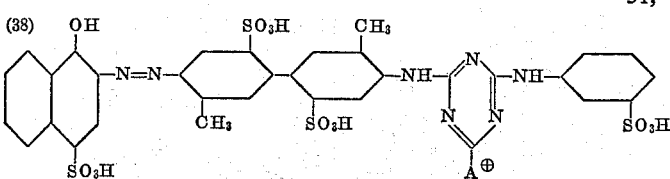

(39) 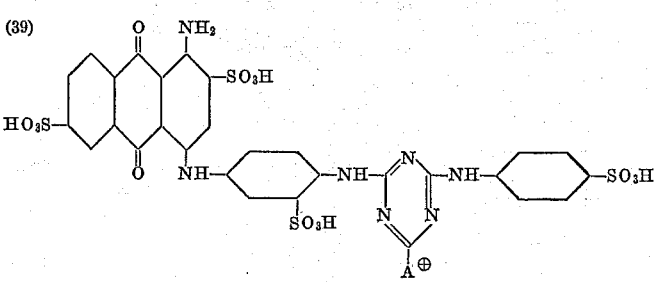

(40) 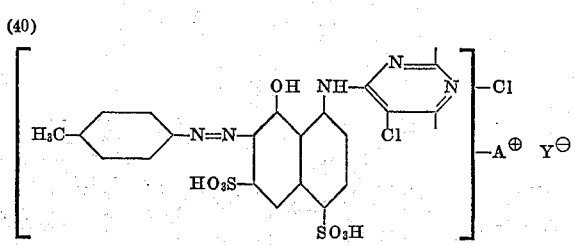

(41) 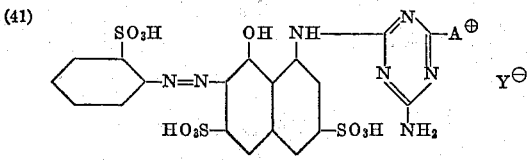

(42) 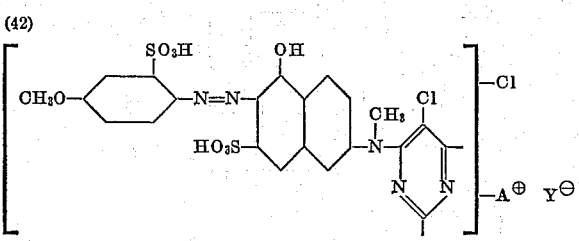

(43) 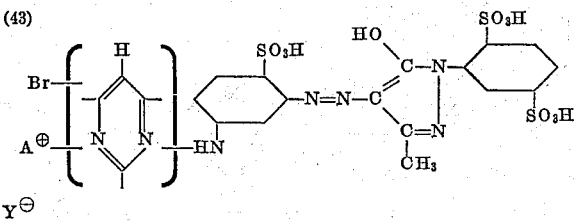

(44) 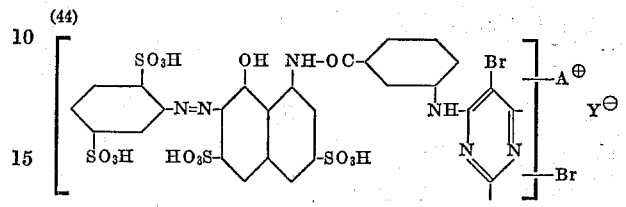

In the formulae of dyes Nos. 14, 19, 21, 22, 24, 29, 31, 40, 42 and 44 the outer chlorine or bromine atom is bound to one of the positions 2 and 6 and $A^\oplus$ is bound to the other position, the dyes forming very probably binary mixtures of the two isomers.

In the formulae of dyes Nos. 26, 32 and 41 the dye radical is bound to one of the positions 2 and 4, the chlorine or bromine atom is bound to one of the positions 2, 4 and 6 and $A^\oplus$ is bound to one of the positions 2, 4 and 6, the two positions 4 and 6 being equivalent and the dyes forming very probably a ternary mixture of the three possible isomers.

The formulae of the dyes of the foregoing examples are as follows

EXAMPLE 1

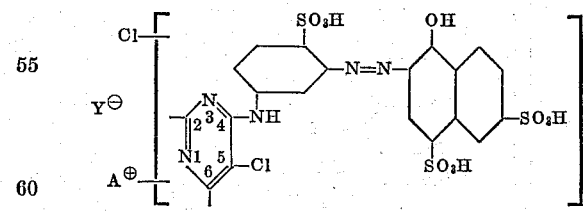

EXAMPLE 2

*First dye*

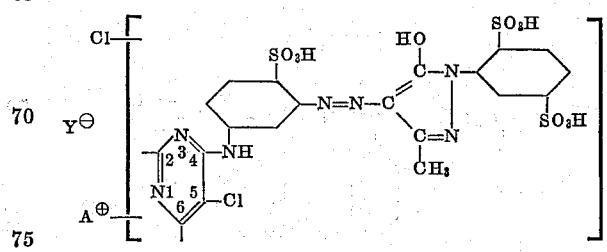

23
*Second dye*
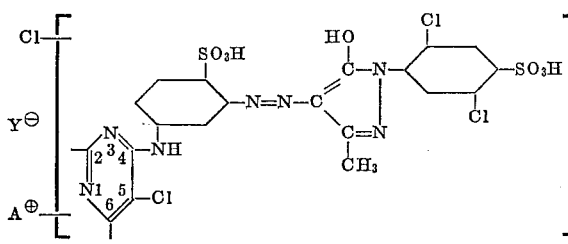
EXAMPLE 3
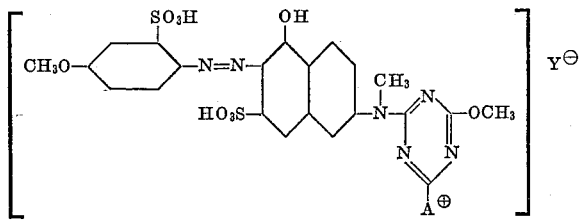
EXAMPLE 4
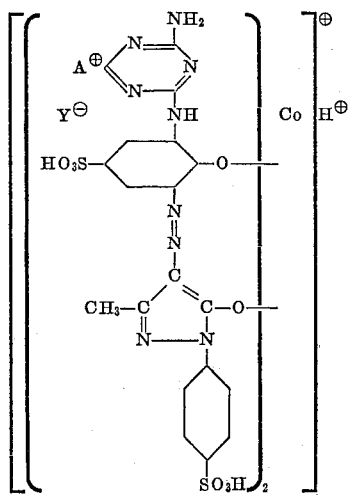
EXAMPLE 5
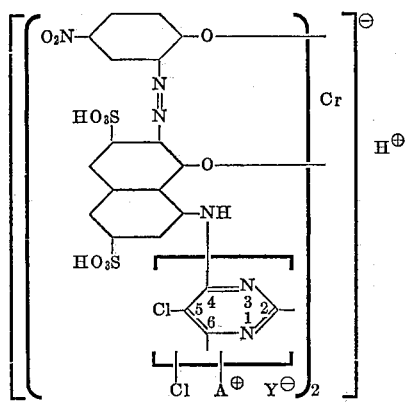
EXAMPLE 6
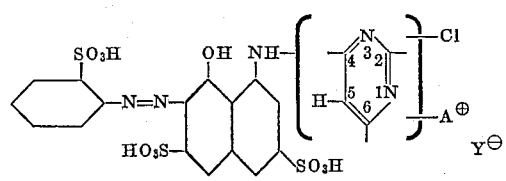
24
EXAMPLE 7
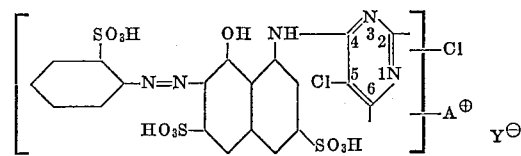
EXAMPLE 8
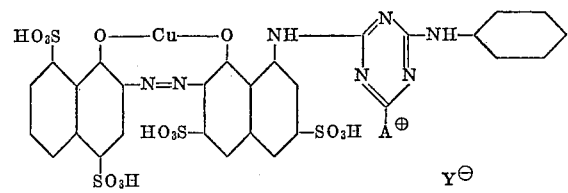
EXAMPLES 9 AND 12
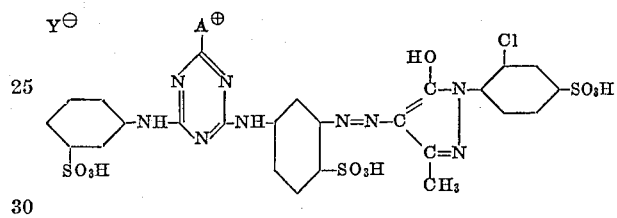
EXAMPLE 10
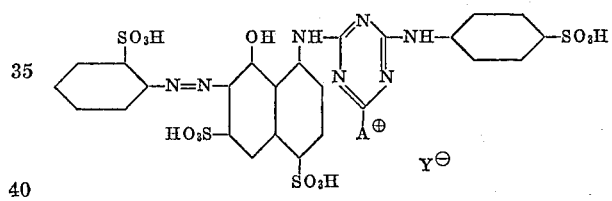
EXAMPLE 11
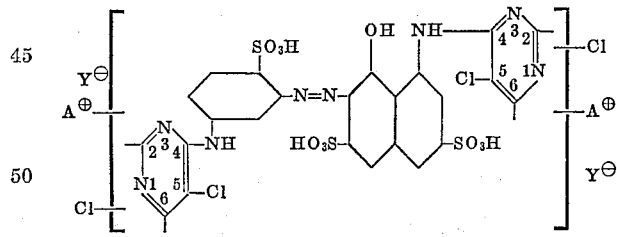
EXAMPLE 13
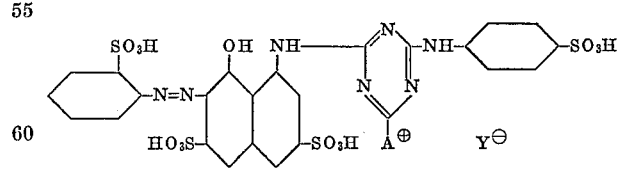
EXAMPLE 14
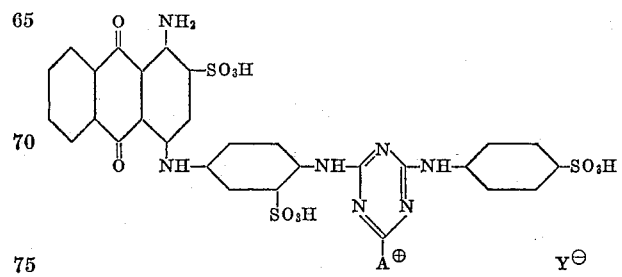

EXAMPLE 15

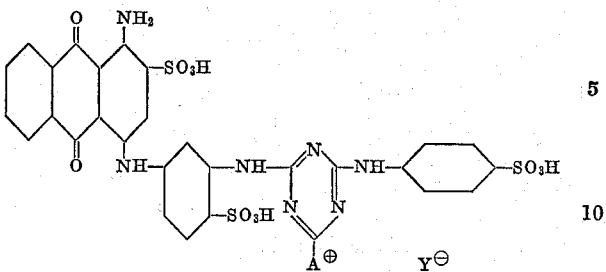

EXAMPLE 16

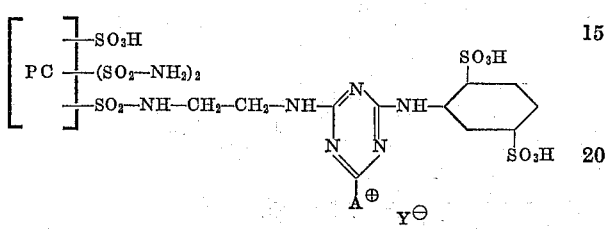

EXAMPLE 17

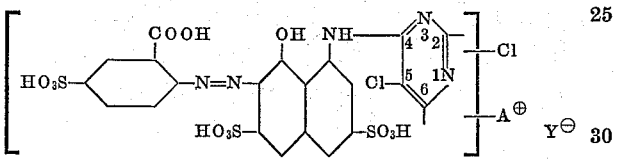

In the preceding formulae —A⊕ represents the grouping

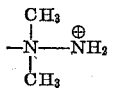

$Y^\ominus$ represents an anion, e.g. a chlorine or bromine ion, the half of a sulfate ion or a sulfonate ion of the dye molecule itself or of a second dye molecule and PC represents the copper phthalocyanine radical.

In the formulae of Examples 5, 7, 11 and 17 the outer chlorine atom is bound to one of the positions 2 and 6 and A⊕ is bound to the other, the dyes forming very probably binary mixtures of the two isomers.

In the formula of Example 6 the dye radical is bound to one of the positions 2 and 4, the chlorine atom is bound to one of the positions 2, 4 and 6 and A⊕ is bound to one of the positions 2, 4 and 6, the two positions 4 and 6 being equivalent and the dye forming very probably a ternary mixture of the three possible isomers.

Having thus disclosed the invention what we claim is:
1. A water-soluble dye of the formula

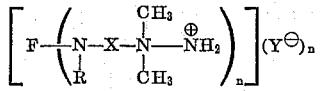

wherein
F is a water-soluble dye grouping of which one exchangeable hydrogen atom is replaced for each

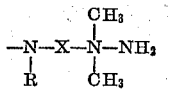

grouping, said water-soluble dye grouping being selected from the class consisting of
(a) unmetallized monoazo dye groupings bearing from 2 to 5 HO₃S— groups and selected from the group consisting of
(1) benzene-azo-naphthalene dye groupings,
(2) benzene-azo-5-pyrazolone dye groupings,
(3) naphthalene-azo-naphthalene dye groupings, and
(4) diphenyl-azo-naphthalene dye groupings;
(b) chromium, cobalt and copper complexes of the unmetallized monoazo dye groupings;
(c) disazo dye groupings bearing from 3 to 6 HO₃S— groups and selected from the group consisting of
(1) benzene - azo - benzene-azo-naphthalene dye groupings and
(2) benzene - azo - naphthalene-azo-benzene dye groupings;
(d) 1-amino - 2 - sulfo-4-arylaminoanthraquinone dye groupings having a total of from 3 to 4 sulfonic acid groups and wherein the aryl is hydrocarbon and is from mononuclear to binuclear; and
(e) copper-phthalocyanine sulfonic acid dye groupings containing from 4 to 5 water-solubilizing substituents selected from the group consisting of —SO₃H and —SO₂—NH₂,
R is a member selected from the group consisting of hydrogen and lower alkyl,
X is a member selected from the group consisting of a divalent radical of the pyrimidine series bearing two halogen atoms with an atomic weight between 35 and 81, each halogen atom being bound to a carbon atom and one halogen atom being in the position 5, a divalent radical of the pyrimidine series bearing one halogen atom with an atomic weight between 35 and 81 bound to a carbon atom and bearing a hydrogen atom in the position 5; a divalent radical of the symmetrical triazine series bearing a lower alkoxy radical; a divalent radical of the symmetrical triazine series bearing an unsubstituted amino group; a divalent radical of the symmetrical triazine series bearing a sulfophenylamino group; and a divalent radical of the symmetrical triazine series bearing a disulfophenylamino group,
$Y^\ominus$ is an anion, and
n is one of the integers 1 and 2.
2. The dye of the formula

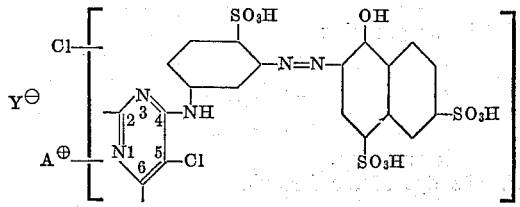

—A⊕ is the grouping

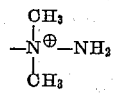

and $Y^\ominus$ is an anion.
3. The dye of the formula

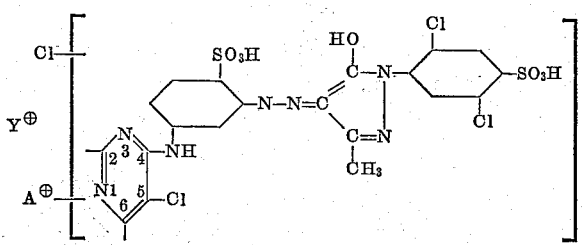

—A⊕ is the grouping

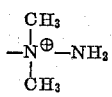

and $Y^\ominus$ is an anion.

4. The dye of the formula
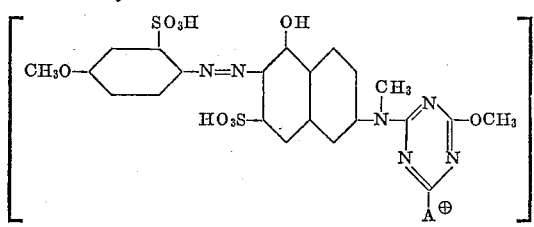
—A⊕ is the grouping
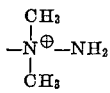
and Y⊖ is an anion.
5. The dye of the formula
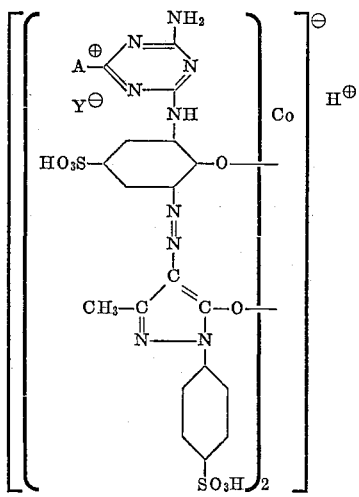
—A⊕ is the grouping
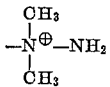
and Y⊖ is an anion.
6. The dye of the formula
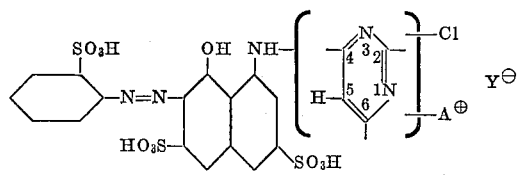
—A⊕ is the grouping
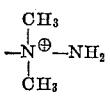
and Y⊖ is an anion.
7. The dye of the formula
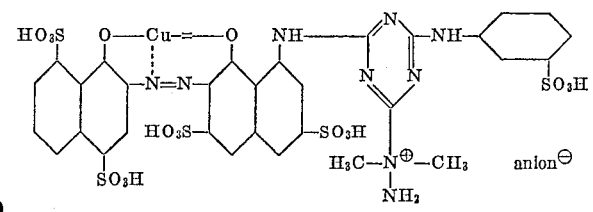
8. The dye of the formula
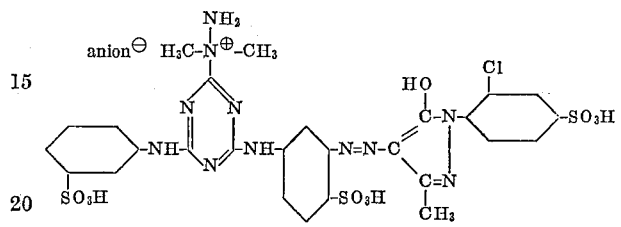
9. The dye of the formula
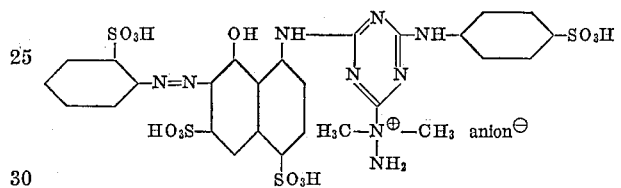
10. The dye of the formula
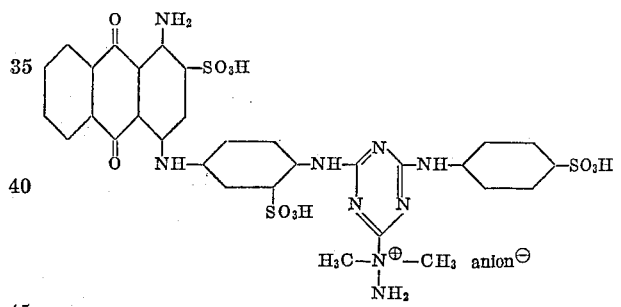
11. The dye of the formula
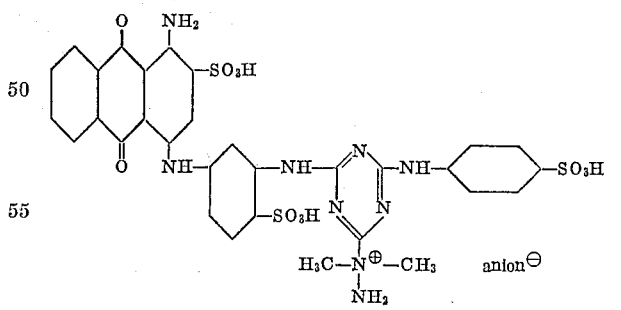
12. The dye of the formula
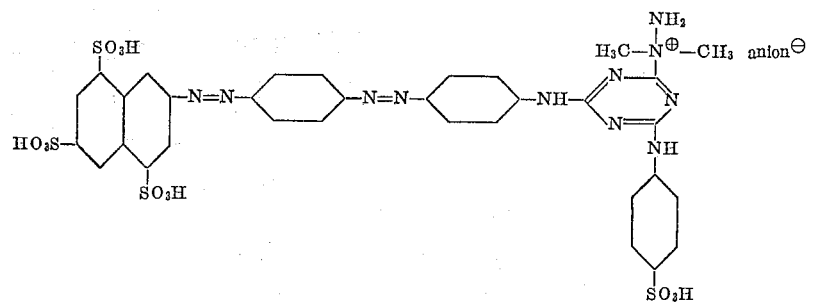

13. The dye of the formula
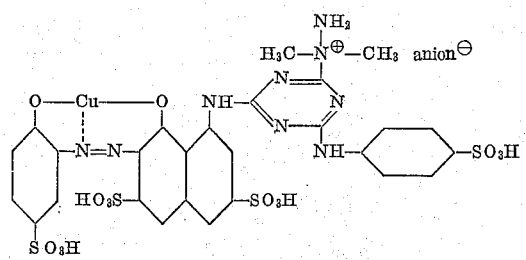
14. The dye of the formula
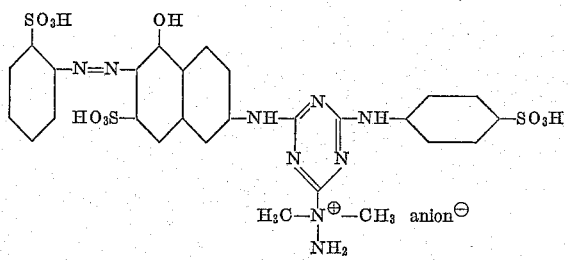
15. The dye of the formula
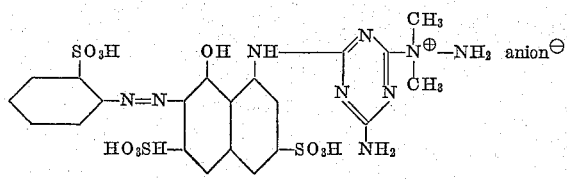
16. The dye of the formula
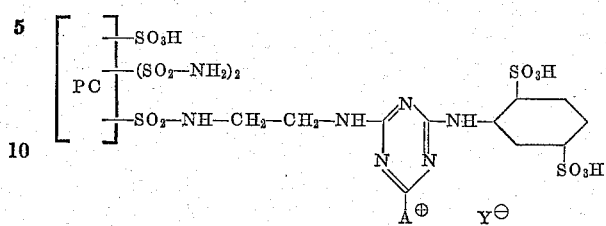
wherein —A⊕ is the grouping
Y⊖ is an anion, and
PC is copper phthalocyaninyl.
References Cited by the Examiner
UNITED STATES PATENTS
2,955,108  10/60  Omietanski _____ 260—205
CHARLES B. PARKER, *Primary Examiner.*